(12) United States Patent
Xiong et al.

(10) Patent No.: US 10,415,131 B2
(45) Date of Patent: Sep. 17, 2019

(54) HOT-DIP GALVANIZED LAYER THICKNESS CONTROL SYSTEM AND METHOD FOR CONTINUOUS THICKNESS-VARYING STRIP MATERIAL

(71) Applicant: BAOSHAN IRON & STEEL CO., LTD., Shanghai (CN)

(72) Inventors: Fei Xiong, Shanghai (CN); Shanqing Li, Shanghai (CN); Zhenglian Jiang, Shanghai (CN); Jianghua Xu, Shanghai (CN)

(73) Assignee: Baoshan Iron & Steel Co., Ltd., Shanghai (CN)

( * ) Notice: Subject to any disclaimer, the term of this patent is extended or adjusted under 35 U.S.C. 154(b) by 0 days.

(21) Appl. No.: 15/763,275

(22) PCT Filed: Mar. 29, 2016

(86) PCT No.: PCT/CN2016/077617
§ 371 (c)(1),
(2) Date: Mar. 26, 2018

(87) PCT Pub. No.: WO2017/054427
PCT Pub. Date: Apr. 6, 2017

(65) Prior Publication Data
US 2018/0282850 A1    Oct. 4, 2018

(30) Foreign Application Priority Data
Sep. 30, 2015 (CN) .......................... 2015 1 0641092

(51) Int. Cl.
C23C 2/20      (2006.01)
C23C 2/06      (2006.01)
C23C 2/40      (2006.01)
C23C 2/00      (2006.01)
C23C 2/16      (2006.01)
B32B 15/01     (2006.01)

(52) U.S. Cl.
CPC ............... *C23C 2/20* (2013.01); *C23C 2/003* (2013.01); *C23C 2/06* (2013.01); *C23C 2/16* (2013.01); *C23C 2/40* (2013.01); *B32B 15/013* (2013.01)

(58) Field of Classification Search
CPC .... C23C 2/06; C23C 2/20; C23C 2/40; B32B 15/013
See application file for complete search history.

(56) References Cited

FOREIGN PATENT DOCUMENTS

| CN | 1610763 | 4/2005 | |
| CN | 1610763 A * | 4/2005 | ............... C23C 2/20 |

(Continued)

OTHER PUBLICATIONS

PCT/CN2016/077617 International Search Report and Written Opinion dated Jul. 5, 2016.

*Primary Examiner* — William P Fletcher, III
(74) *Attorney, Agent, or Firm* — Thomas | Horstemeyer, LLP

(57) ABSTRACT

Disclosed are a system and method for controlling a thickness of a hot-dip galvanized coating on a strip material with a continuously varying thickness. The system of the present disclosure is capable to provide a zinc coating with a uniform thickness on a coiled starting material with a continuously varying thickness, and the method of the present disclosure provides a simplified process to achieve such objective.

11 Claims, 5 Drawing Sheets

(56) References Cited

FOREIGN PATENT DOCUMENTS

| | | | |
|---|---|---|---|
| JP | 2011183438 | 9/2011 | |
| JP | 2011184791 | 9/2011 | |
| WO | WO-03018859 A2 * | 3/2003 | ............... C23C 2/20 |

* cited by examiner

HOT-DIP GALVANIZED LAYER THICKNESS CONTROL SYSTEM AND METHOD FOR CONTINUOUS THICKNESS-VARYING STRIP MATERIAL

CROSS-REFERENCE TO RELATED APPLICATIONS

This application is a 371 U.S. National Phase of PCT International Application No. PCT/CN2016/077617, filed on Mar. 29, 2016, which claims benefit and priority to Chinese patent application No. 201510641092.6, filed on Sep. 30, 2015. Both of the above-referenced applications are incorporated by reference herein in their entirety.

TECHNICAL FIELD

The invention relates to a cold-rolling system and method, and more specifically, to a system and method for controlling a thickness of a hot-dip galvanized coating on a strip material with a continuously varying thickness.

BACKGROUND ART

Rolled strip materials with a continuously varying thickness, that is, variable thickness plates, are currently promoted in the automobile industry to produce lightweight automobiles. As shown in FIG. 1, such a variable thickness plate can be obtained by sheet rolling or coil rolling, and is generally produced by using the more efficient coil rolling method in the industry.

Plate materials are required to be corrosion resistant in some application scenarios. Therefore, some variable thickness plates must be supplied in a galvanized form. Galvanization includes hot-dip galvanization and electrogalvanization. Hot-dip galvanization is more cost-effective and environmentally-friendly than electrogalvanization.

Several existing production methods are as follows:

In a production process used in the patent CN 101796210.B, a hot-rolled steel strip is first hot-dip galvanized or hot-dip aluminized and then rolled with a continuously varying thickness. Subsequently, plate materials needed by a user are cut from a steel coil as required.

In a method used in the patent CN 103806029.A, a strip material is flexibly rolled, then electroplated, then alloyed, and delivered to a user for shaping.

In a method proposed in the patent U.S. Pat. No. 8,522,586B2, a hot-rolled or cold-rolled starting material is hot-dip coated or electroplated and then flexibly rolled. Subsequent processes are then performed.

In the patent CN 102712961, a hot-rolled starting material is flexibly rolled, then subjected to recrystallization annealing, then electroplated, and alloyed.

SUMMARY OF THE INVENTION

In view of the problem of a complex galvanization process for a variable thickness steel plate in the prior art, the objective of the invention is to provide a system and method for controlling a thickness of a hot-dip galvanized coating on a strip material with a continuously varying thickness.

In order to achieve the above objective, the following technical solution is used in the invention:

a system for controlling a thickness of a hot-dip galvanized coating on a strip material with a continuously varying thickness, comprising a steel strip thickness gauge, a length measuring roller, a hot-dip galvanizing apparatus, an air knife, a cold-state zinc coating measuring instrument, and a control system. In a forward movement direction of a steel strip, the steel strip thickness gauge and the length measuring roller are arranged before an inlet of the hot-dip galvanizing apparatus, and the air knife and the cold-state zinc coating measuring instrument are sequentially arranged behind an outlet of the hot-dip galvanizing apparatus. The steel strip thickness gauge detects a thickness signal of the steel strip, the length measuring roller detects a length signal of the steel strip, the cold-state zinc coating measuring instrument detects a zinc coating thickness of the steel strip, and the steel strip thickness gauge, the length measuring roller, and the cold-state zinc coating measuring instrument respectively send measurement data to the control system. the control system predicts a thickness of the steel strip at the air knife and adjusts a pressure of the air knife according to the length signal and the thickness signal, and further adjusts the pressure of the air knife according to the zinc coating thickness.

According to an embodiment of the invention, the hot-dip galvanizing apparatus comprises a furnace snout, a zinc pot, a sink roller, and a stabilizing roller. The zinc pot is a main body of the hot-dip galvanizing apparatus, the furnace snout is an inlet of the zinc pot, the sink roller is arranged inside the zinc pot, and the stabilizing roller is arranged at an outlet of the zinc pot.

According to an embodiment of the invention, a distance of the air knife is between 9 mm and 15 mm, and the air knife is positioned higher than the hot-dip galvanizing apparatus by 300 mm to 600 mm.

According to an embodiment of the invention, the control system compares the zinc coating thickness with a set value and performs calculation, so as to further adjust the pressure of the air knife.

According to an embodiment of the invention, an annealing furnace is arranged before the steel strip thickness gauge and the length measuring roller in the forward movement direction of the steel strip.

To achieve the foregoing objective, the following technical solution is further used in the invention:

a method for controlling a thickness of a hot-dip galvanized coating on a strip material with a continuously varying thickness, comprising the following steps: setting a contour size of a target steel strip in flexible rolling; setting pressures of an air knife that correspond to two equal-thickness sections according to the set contour size; measuring a length and a thickness of a steel strip before a hot-dip galvanization; adjusting the pressure of the air knife according to the length and the thickness of the steel strip before the hot-dip galvanization; measuring the thickness of the steel strip and a zinc coating thickness after the hot-dip galvanization; calculating thickness deviation values corresponding to the two equal-thickness sections according to the thickness of the steel strip and the zinc coating thickness after the hot-dip galvanization; calculating pressure adjustment amounts of the air knife that correspond to the two equal-thickness sections according to the thickness deviation values; and adjusting the pressure of the air knife.

In the foregoing technical solutions, by means of the system and method for controlling a thickness of a hot-dip galvanized coating on a strip material with a continuously varying thickness of the invention, a coiled starting material with a continuously varying thickness can have a uniform zinc coating thickness, and the process is simple.

DETAILED DESCRIPTION OF EMBODIMENTS

The technical solutions of the invention are further described below with reference to the accompanying drawings and embodiments.

Figure 1:
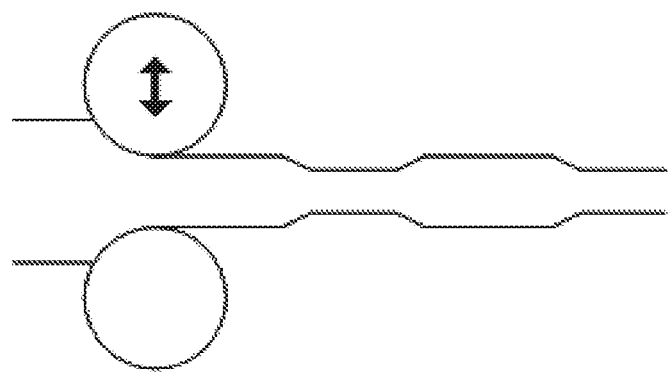
FIG. 1 is a schematic diagram of flexible rolling.
Figure 2:
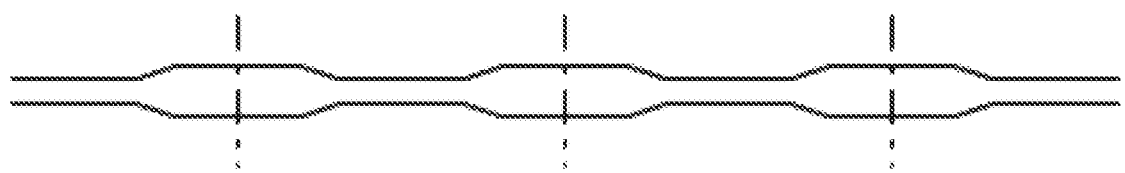
FIG. 2 is a schematic diagram of a contour of a steel strip at an inlet of a hot-dip galvanizing unit.

FIG. 2 shows a set contour of an outlet with a continuously varying thickness, and is also an illustration of a thickness contour of a steel strip at an inlet of a hot-dip galvanizing unit.

The zinc coating thickness is susceptible to many factors such as a thickness, a width, a plate shape, a surface roughness, and a temperature of a steel strip, and a temperature and contents of molten zinc. For a steel strip 1 with a continuously varying thickness, a thickness of a raw material inevitably changes periodically, whereas the temperature of the steel strip and the temperature and contents of the molten zinc are process conditions and are basically not changed. Therefore, only an air knife 5 can be adjusted to control the zinc coating thickness. Therefore, the essence of the invention is to adjust parameters of an air knife to control a zinc coating thickness.

Further, major parameters of the air knife in the invention comprise a pressure of the air knife, a distance of a nozzle of the air knife 5 from a surface of the steel strip 1, a running speed of the steel strip 1, a height of the air knife 5 from a liquid level in a zinc pot 2, a gap of the nozzle, a blowing angle, etc. A lip gap of the parameters of the air knife is fixed when the air knife 5 is mounted and may be considered to be a constant. In this case, the major factors that affect the zinc coating thickness comprise only five variables, that is, the pressure of the air knife, the blowing angle, the distance of the air knife, the height of the air knife, and the speed of the steel strip. The zinc coating thickness is most significantly affected by the variables such as the speed of the steel strip, the pressure of the air knife, and the distance of the air knife.

Figure 3:
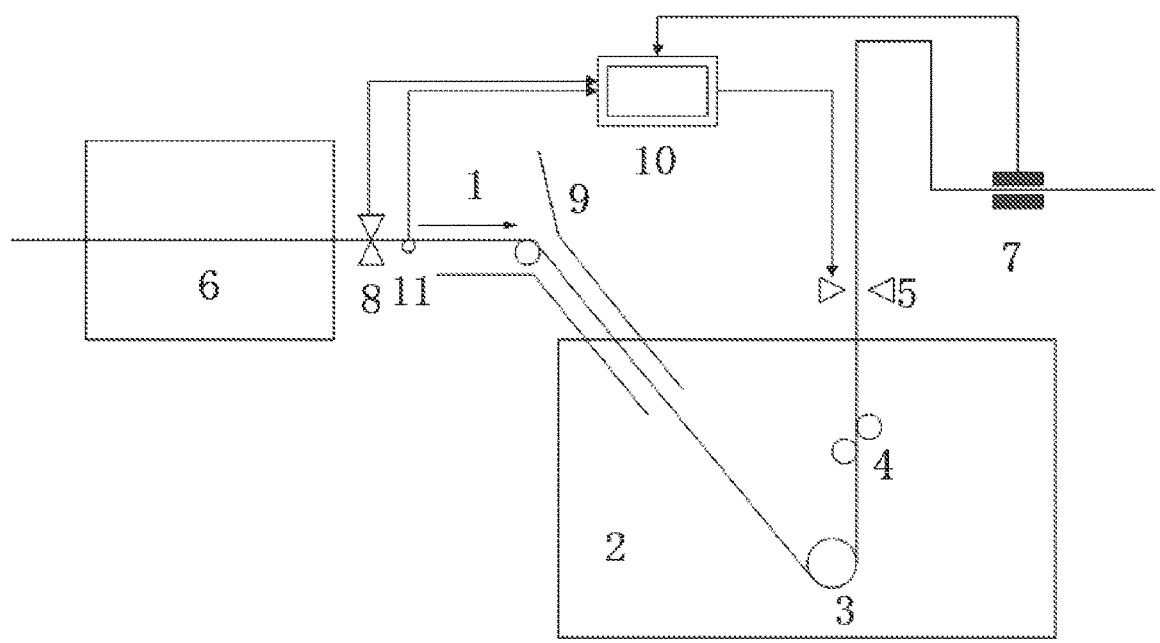
FIG. 3 is a schematic structural diagram of a system for controlling a thickness of a hot-dip galvanized coating on a strip material with a continuously varying thickness according to the invention.

Therefore, referring to FIG. 3, first disclosed in the invention is a system 10 for controlling a thickness of a hot-dip galvanized coating on a strip material with a continuously varying thickness. The main structures of the system comprise a steel strip thickness gauge 8, a length measuring roller 11, a hot-dip galvanizing apparatus, an air knife 5, a cold-state zinc coating measuring instrument 7, a control system 10, an annealing furnace 6, etc. The hot-dip galvanizing apparatus further comprises a furnace snout 9, a zinc pot 2, a sink roller 3, and a stabilizing roller 4. The effects and connection relationships of the foregoing structures are further described below in detail.

As shown in FIG. 3, the zinc pot 2 is a main body of the hot-dip galvanizing apparatus, the furnace snout 9 is an inlet of the zinc pot 2, the sink roller 3 is arranged inside the zinc pot 2, and the stabilizing roller 4 is arranged at an outlet of the zinc pot 2. In a forward movement direction of the steel strip, the annealing furnace 6 is arranged before the steel strip thickness gauge 8 and the length measuring roller 11. The running speed of the steel strip 1 depends on adjacent procedures on a production line. The speed is a disturbance amount rather than an adjustment amount in the control of the zinc coating thickness. In a production process, the distance of the air knife is generally controlled between 9 mm and 15 mm and is not dynamically adjusted. The value of the height of the air knife usually depends on the running speed of the steel strip 1, and is generally higher than that of the zinc pot 2 by 300 mm to 600 mm A nozzle angle is adjusted offline Therefore, the zinc coating thickness is actually controlled by adjusting the pressure of the air knife.

Referring to FIG. 3 again, in the forward movement direction of the steel strip, the steel strip thickness gauge 8 and the length measuring roller 11 are arranged before an inlet of the hot-dip galvanizing apparatus, and the air knife 5 and the cold-state zinc coating measuring instrument 7 are sequentially arranged behind an outlet of the hot-dip galvanizing apparatus. The steel strip thickness gauge 8 detects a thickness signal of the steel strip 1, the length measuring roller 11 detects a length signal of the steel strip 1, the cold-state zinc coating measuring instrument 7 detects the zinc coating thickness of the steel strip 1, and the steel strip thickness gauge 8, the length measuring roller 11 and the cold-state zinc coating measuring instrument 7 respectively send measurement data to the control system 10.

The control system 10 first pre-sets pressures of the air knife 5 for the steel strip 1 with different thicknesses according to a required zinc coating thickness, that is, predicts a thickness of the steel strip at the air knife 5 and adjusts the pressure of the air knife 5 according to the length signal and the thickness signal first. Specifically, after leaving the annealing furnace 6, the steel strip 1 sequentially passes through the steel strip thickness gauge 8 and the length measuring roller 11. The measured thickness and length information are sent to the control system 10. The control system 10 combines the thickness information and the length information, to obtain thickness contour information of the steel strip 1. At the same time, the control system 10 tracks the steel strip 1, calculates a corresponding thickness of the steel strip 1 at the air knife 5, and performs adjustment according to the pre-set pressures.

At the same time, the cold-state zinc coating measuring instrument 7 measures the zinc coating thickness of the strip material and sends same to the control system 10. The control system 10 calculates the deviation between the measured zinc coating thickness of the steel strip 1 and a pre-set value of the zinc coating thickness, and further adjusts the pre-set pressures of the air knife by combining the deviation and the thickness information of the steel strip 1 at a measurement position obtained by means of tracking and calculation.

Figure 4:
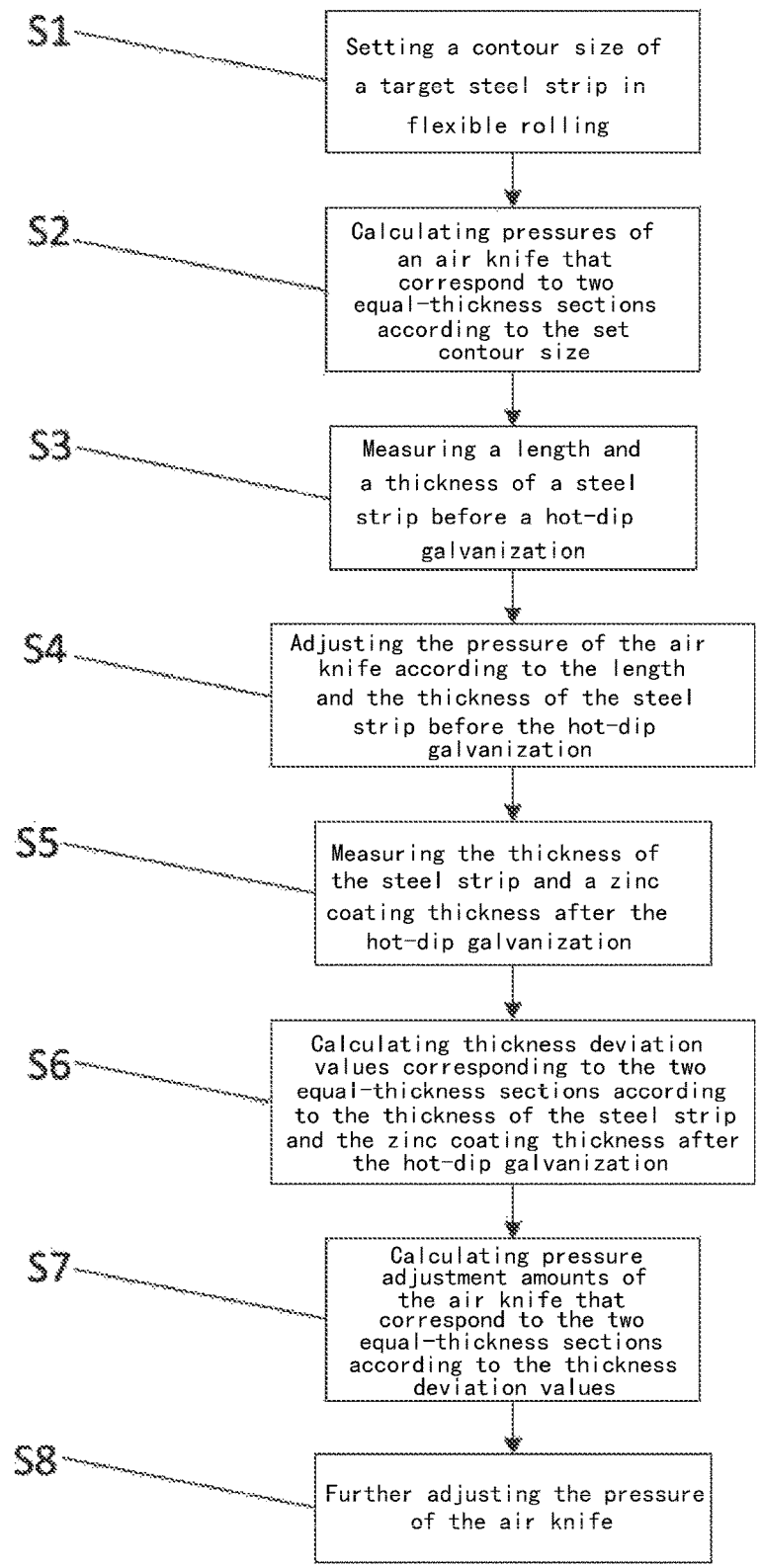
FIG. 4 is a flowchart of a method for controlling a thickness of a hot-dip galvanized coating on a strip material with a continuously varying thickness according to the invention.

In addition, referring to FIG. 4, further disclosed in the invention is a method for controlling a thickness of a hot-dip galvanized coating on a strip material with a continuously varying thickness. The method comprises the following steps:

S1: Setting a contour size of a target steel strip in flexible rolling.

S2: Calculating pressures of an air knife that correspond to two equal-thickness sections according to the set contour size.

S3: Measuring a length and a thickness of a steel strip before a hot-dip galvanization.

S4: Adjusting the pressure of the air knife according to the length and the thickness of the steel strip before the hot-dip galvanization.

S5: Measuring the thickness of the steel strip and a zinc coating thickness after the hot-dip galvanization.

S6: Calculating thickness deviation values corresponding to the two equal-thickness sections according to the thickness of the steel strip and the zinc coating thickness after the hot-dip galvanization.

S7: Calculating pressure adjustment amounts of the air knife that correspond to the two equal-thickness sections according to the thickness deviation values.

S8: Further adjusting the pressure of the air knife.

The foregoing method is further described below by using an embodiment.

Figure 5:
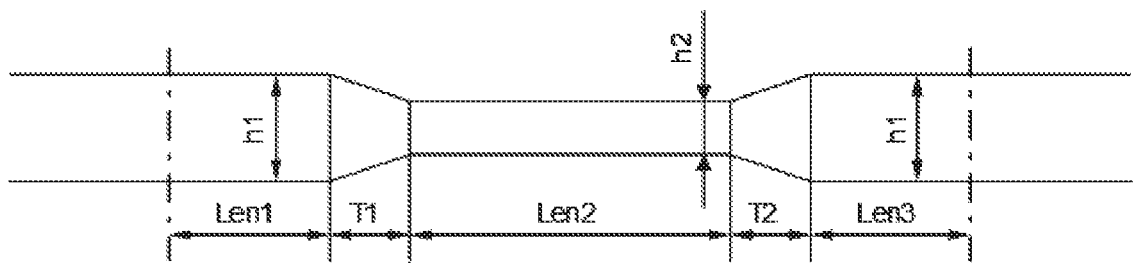
FIG. 5 is a schematic diagram of a sample with unequal thicknesses.

As shown in FIG. 5, a sample of a variable thickness plate comprises two equal-thickness sections h1, h2. During rolling, a length value and a thickness value of one sample are set, and rolling is then periodically performed. Therefore, the thickness of a steel strip at an inlet of a galvanizing unit presents periodic changes.

S1: Setting a contour size of a target steel strip in flexible rolling, wherein a target contour of each sample in flexible rolling is set to be:

thicknesses: h1=2.0 mm, and h2=1.0 mm lengths: Len1=250 mm, T1=100 mm, Len2=500 mm, T2=100 mm, and Len3=250 mm required zinc coating thickness: ch=80 g/m$^2$ S2: Setting pressures of an air knife that correspond to two equal-thickness sections according to the set contour size. Before a hot-dip galvanization begins, the size of the steel strip is first input into a control system 10. The control system 10 calculates the pressures p1, p2 of the air knife that correspond to the two equal-thickness sections according to a running speed of the steel strip and the thickness of the steel strip.

Different from a conventional hot-dip galvanizing unit, the invention comprises a tracking module, with an input signal being provided by a length measuring roller 11. The function of the tracking module is implemented in the control system 10. The control system 10 adjusts the pressure of the air knife according to pre-set pressure values of the air knife before the galvanization begins, and outputs a set value to an execution mechanism.

S3: Measuring a length and a thickness of a steel strip before the hot-dip galvanization. During galvanization, the thickness gauge 8 and the length measuring roller 11 send the measured position and thickness of the steel strip 1 to the control system 10.

S4: Adjusting the pressure of the air knife according to the length and the thickness of the steel strip before the hot-dip galvanization. The control system 10 combines the length and the thickness. A distance between the length measuring roller 11 and the air knife 5 is constant. Therefore, by using the tracking function of the control system 10, the thickness of the steel strip at the air knife 5 may be calculated according to the running speed of the steel strip, and the pressure of the air knife is adjusted.

S5: Measuring the thickness of the steel strip and a zinc coating thickness after the hot-dip galvanization.

A cold-state zinc coating measuring instrument 7 is arranged behind the air knife. A coating thickness of the steel strip 1 is measured and the measured value is sent to the control system 10. The tracking function of the control system calculates the thickness of the steel strip at the cold-state zinc coating measuring instrument 7.

S6: Calculating thickness deviation values corresponding to the two equal-thickness sections according to the thickness of the steel strip and the zinc coating thickness after the hot-dip galvanization.

The control system combines the thickness value of the steel strip at the cold-state zinc coating measuring instrument 7 and the coating thickness value, so as to obtain coating thickness deviation values $\Delta ch1$, $\Delta ch2$ corresponding to the two equal-thickness sections.

S7: Calculating pressure adjustment amounts of the air knife that correspond to the two equal-thickness sections according to the thickness deviation values.

According to the two deviation values, the control system calculates the pressure adjustment amounts $\Delta p1$, $\Delta p2$ of the air knife that correspond to the two equal-thickness sections. This is actually a feedback control process.

S8: Further adjusting the pressure of the air knife.

Next, the control system 10 outputs a pressure value $p1+\Delta p1$ or $p2+\Delta p2$ of the air knife to the execution mechanism according to the thickness of the steel strip at the air knife 5.

It should be appreciated by those of ordinary skill in the art that the foregoing embodiments are only used to describe the invention rather to limit the invention. Changes or variations made to the embodiments within the essential spirit and scope of the invention fall within the scope of the claims of the invention.

The invention claimed is:

1. A system for controlling a thickness of a hot-dip galvanized coating on a strip material with a variable thickness, comprising:

a steel strip thickness gauge, a length measuring roller, a hot-dip galvanizing apparatus, an air knife, a cold-state zinc coating measuring instrument, and a control system, wherein in a forward movement direction of a steel strip, the steel strip having a variable thickness with continuous transition of the thicknesses, the steel strip thickness gauge and the length measuring roller are arranged before an inlet of the hot-dip galvanizing apparatus, and the air knife and the cold-state zinc coating measuring instrument are sequentially arranged behind an outlet of the hot-dip galvanizing apparatus, the air knife set in a fixed position;

the steel strip thickness gauge detects a thickness signal of the steel strip, the length measuring roller detects a length signal of the steel strip, the cold-state zinc coating measuring instrument detects a zinc coating thickness of the steel strip, and the steel strip thickness gauge, the length measuring roller and the cold-state zinc coating measuring instrument respectively send measurement data to the control system; and the control system predicts a thickness of the steel strip at the air knife and adjusts a pressure of the air knife according to the length signal and the thickness signal, and further adjusts the pressure of the air knife according to the zinc coating thickness.

2. The system according to claim 1, wherein the hot-dip galvanizing apparatus comprises a furnace snout, a zinc pot, a sink roller, and a stabilizing roller, wherein the zinc pot is a main body of the hot-dip galvanizing apparatus, the furnace snout is an inlet of the zinc pot, the sink roller is arranged inside the zinc pot, and the stabilizing roller is arranged at an outlet of the zinc pot.

3. The system according to claim 1, wherein a distance of the air knife is between 9 mm and 15 mm, and the air knife is positioned higher than the hot-dip galvanizing apparatus by 300 mm to 600 mm.

4. The system according to claim 1, wherein the control system compares the zinc coating thickness with a set value and performs calculation, so as to further adjust the pressure of the air knife.

5. The system according to claim 1, further comprising an annealing furnace arranged before the steel strip thickness gauge and the length measuring roller in the forward movement direction of the steel strip.

6. The system of claim 1, wherein the steel strip has a periodically varying thickness.

7. The system of claim 1, wherein the steel strip has a first portion of a first uniform thickness and a second portion of a second uniform thickness.

8. The system of claim 7, wherein the continuous transition of the thicknesses comprises a gradual change in thickness between the first uniform thickness and the second uniform thickness.

9. The system of claim 1, wherein a distance between the length measuring roller and the air knife is constant.

10. The system of claim 1, wherein the control system is configured to further adjust the pressure of the air knife by calculating the deviation between a measured value of the zinc coating thickness and a set value of the zinc coating thickness.

11. A method for controlling a thickness of a hot-dip galvanized coating on a strip material with a variable thickness, comprising the following steps:

setting a contour size of a steel strip in flexible rolling, the steel strip having a variable thickness with a continuous transition of the thicknesses;

setting pressures of an air knife that correspond to two uniform thickness sections according to the set contour size;

measuring a length and a thickness of the steel strip before a hot-dip galvanization;

adjusting the pressure of the air knife according to the length and the thickness of the steel strip measured before the hot-dip galvanization;

measuring the thickness of the steel strip and a zinc coating thickness after the hot-dip galvanization;

calculating thickness deviation values corresponding to the two uniform thickness sections according to the thickness of the steel strip and the zinc coating thickness measured after the hot-dip galvanization;

calculating pressure adjustment amounts of the air knife that correspond to the two uniform thickness sections according to the thickness deviation values; and adjusting the pressure of the air knife.

\* \* \* \* \*